US012808450B2

(12) United States Patent
Doughty et al.

(10) Patent No.: US 12,808,450 B2
(45) Date of Patent: Nov. 24, 2026

(54) MODULAR VALVE ASSEMBLY

(71) Applicant: WATTS REGULATOR CO., North Andover, MA (US)

(72) Inventors: Jason Warren Doughty, Fitchburg, MA (US); Frank DiBenedetto, Ipswich, MA (US)

(73) Assignee: WATTS REGULATOR CO., North Andover, MA (US)

( * ) Notice: Subject to any disclaimer, the term of this patent is extended or adjusted under 35 U.S.C. 154(b) by 0 days.

(21) Appl. No.: 19/209,153

(22) Filed: May 15, 2025

(65) Prior Publication Data

US 2026/0366639 A1 Nov. 19, 2026

(51) Int. Cl.
*F16L 27/12* (2006.01)
*F16K 27/00* (2006.01)

(52) U.S. Cl.
CPC .................................. *F16K 27/003* (2013.01)

(58) Field of Classification Search
CPC .. F16K 2200/20; F16K 2200/50; E03B 7/077; F16L 27/12; F16L 27/127; F16L 27/1275; F16L 27/12751
See application file for complete search history.

(56) References Cited

U.S. PATENT DOCUMENTS 3,173,439 A 3/1965 Griswold et al.
3,356,337 A 12/1967 Olen
3,424,430 A 1/1969 Hoelsch
3,602,247 A 8/1971 Bunn et al.
3,672,632 A 6/1972 Chow
4,615,353 A * 10/1986 McKee ................. F16K 11/044
251/61.3

(Continued)

FOREIGN PATENT DOCUMENTS

| | | |
|---|---|---|
| DE | 19924973 | 12/1999 |
| WO | 0070246 | 11/2000 |
| WO | 2019171248 | 9/2019 |

OTHER PUBLICATIONS

U.S. Office Action issued Jul. 24, 2025, received in U.S. Appl. No. 18/380,373, 14 pages.

(Continued)

*Primary Examiner* — Paul J Gray
(74) *Attorney, Agent, or Firm* — Secant IP, PLLC

(57) ABSTRACT

A modular valve assembly may include an inlet endplate, an outlet endplate, a first flow fixture disposed between the inlet endplate and the outlet endplate, a second flow fixture disposed between the inlet endplate and the outlet endplate, the first flow fixture and the second flow fixture movable between a flow position and a maintenance position, and an expansion coupling disposed between the first flow fixture and the second flow fixture, the expansion coupling being configured to move between an expanded position and a compressed position. When the expansion coupling is in the compressed position, the first flow fixture and the second flow fixture may be moveable from the flow position towards the maintenance position. When the expansion coupling is in the expanded position, movement of first flow fixture and the second flow fixture from the flow position towards the maintenance position may be restricted.

20 Claims, 6 Drawing Sheets

(56) References Cited

U.S. PATENT DOCUMENTS

| | | | | |
|---|---|---|---|---|
| 4,754,776 | A * | 7/1988 | McKee | F16K 11/044 92/49 |
| 6,164,335 | A | 12/2000 | Hayashi et al. | |
| 6,581,632 | B2 | 6/2003 | Walpole et al. | |
| 7,434,593 | B2 * | 10/2008 | Noll | F16K 15/066 137/454.2 |
| 7,784,483 | B2 * | 8/2010 | Grable | E03B 7/077 137/315.33 |
| 8,333,214 | B2 | 12/2012 | Ellis | |
| 9,523,436 | B2 | 12/2016 | Mohamed et al. | |
| 10,683,859 | B2 | 6/2020 | Schulz | |
| 10,859,078 | B2 | 12/2020 | Schulz | |
| 2003/0089403 | A1 * | 5/2003 | Duncan | E03B 7/077 137/512 |
| 2007/0204917 | A1 | 9/2007 | Clayton et al. | |
| 2009/0090415 | A1 | 4/2009 | Harris et al. | |
| 2018/0100597 | A1 | 4/2018 | Schwartz et al. | |
| 2020/0230634 | A1 * | 7/2020 | Piscol | B05B 12/149 |
| 2024/0035585 | A1 | 2/2024 | Morris et al. | |

OTHER PUBLICATIONS

U.S. Office Action issued Dec. 4, 2024, received in U.S. Appl. No. 18/380,373, 11 pages.

International Search Report and Written Opinion from PCT/AU2022/050348 mailed Jun. 8, 2022. 14 pages.

International Preliminary Report on Patentability from corresponding PCT Appln. No. PCT/AU2022/050348, dated Oct. 12, 2023. 8 pages.

Extended European Search Report dated Feb. 6, 2025, received in European Patent Application No. 22787172.0, 9 pages.

* cited by examiner

MODULAR VALVE ASSEMBLY

TECHNICAL FIELD

The present disclosure is generally directed to valves and more specifically to a modular valve assembly.

BACKGROUND INFORMATION

Fluid supply systems can convey fluid from a pressurized source such as a municipal water supply to a destination, such as a building or other structure. For example, buildings can include a water supply system that is configured to receive a pressurized supply of water from a municipal water system and to convey water to various outlets such as toilets, faucets, fire prevention systems, etc., within the building.

Plumbers and plumbing designers can be tasked with controlling the flow of fluid within a building or other structure. To that end, a plumber or plumbing designer may employ a plurality of valves that are fluidly coupled to pipes and other fluid conduits to control fluid flow. For example, plumbers or designers may employ shutoff valves to permit or prevent fluid flow in a fluid system. Likewise, check valves may be employed to permit fluid flow in a first direction through the valve, while preventing backflow of fluid through the valve. Similarly, pressure reducing valves may be used to adjust fluid pressure within all or a part of a fluid system, and strainers may be employed to screen out solids from a fluid.

Although existing flow fixtures (e.g., shutoff valves, check valves, pressure reducing valves, strainers, and/or any other flow fixture) are useful, they are not without limitations. For example, existing flow fixtures may themselves consume a large amount of space, and, therefore, may be difficult to install in confined spaces. This problem is exacerbated when flow fixtures need to be coupled to one another by intervening piping (or other fluid conduit). For example, when a plumbing system calls for the use of a shutoff valve, a check valve, and a pressure reducing valve fluidly coupled in series, it may be necessary for a plumber to connect the shutoff valve to the check valve via a first connecting pipe, and the check valve to the pressure reducing valve via a second connecting pipe. Although such a connection can be reliably made and can result in a functional plumbing assembly, the first and second connecting pipes can increase the cost and extend the overall length of the plumbing assembly.

In some instances, a plurality of flow fixtures may be disposed within a single valve assembly. While such a configuration may reduce the amount of space consumed by the flow fixtures, repair and/or maintenance of the flow fixtures may present one or more challenges. For example, repair and/or maintenance of one of the plurality of flow fixtures may require removal and/or replacement of the whole valve assembly.

BRIEF DESCRIPTION OF THE DRAWINGS

These and other features and advantages will be better understood by reading the following detailed description, taken together with the drawings, wherein.

DETAILED DESCRIPTION

The present disclosure is generally directed to a modular valve assembly. The modular valve assembly may include a plurality of endplates, a plurality of flow fixtures, and an expansion coupling. The plurality of flow fixtures are disposed between the plurality of endplates and the expansion coupling is disposed between the plurality of flow fixtures. The expansion coupling is configured to be selectively compressible to allow each of the flow fixtures to move from a flow position towards a maintenance position. Selective compression of the expansion coupling may allow for a compressive force retaining the plurality of flow fixtures in the flow position (e.g., and in a sealing engagement with at least one other component of the modular valve assembly) to be reduced (or removed), allowing the flow fixtures to be transitioned towards the maintenance position (e.g., in response to a user exerted force). Absent the selective compression of the expansion coupling, frictional forces may be too great for a user exerted force to overcome.

Figure 1:
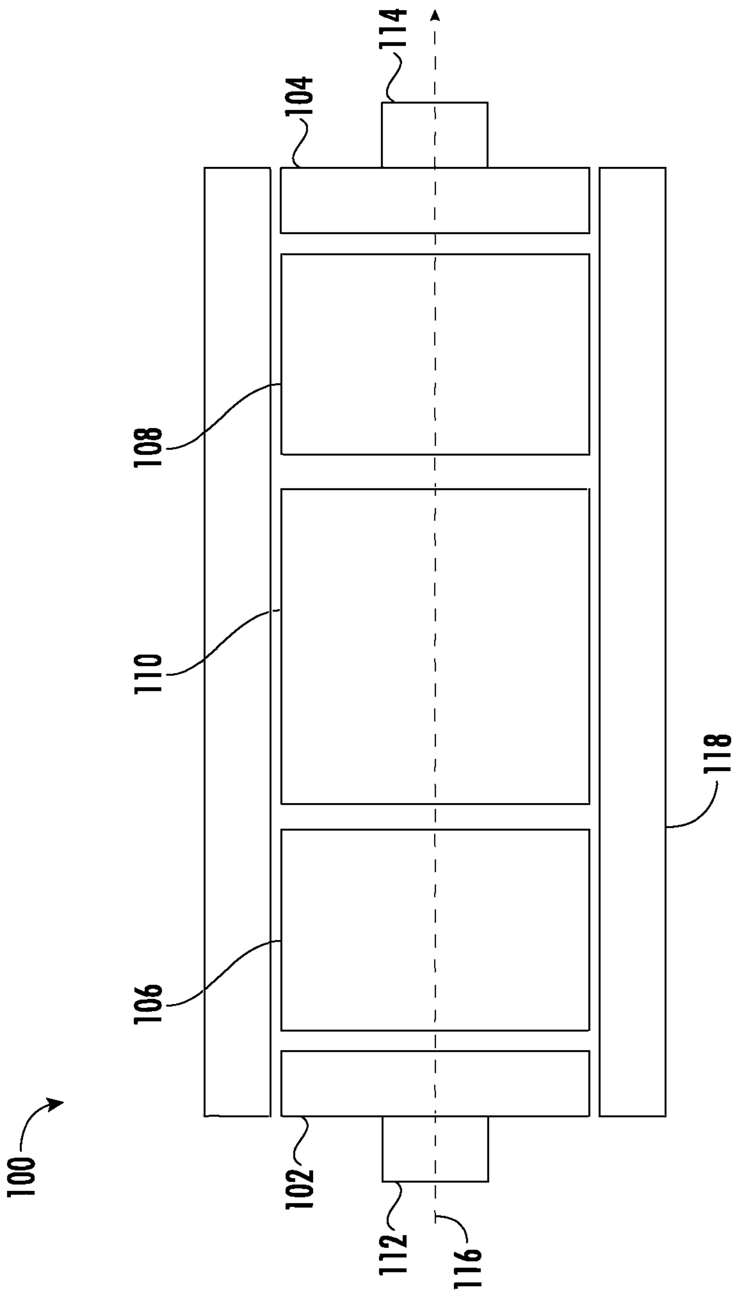
FIG. 1 is a schematic example of a modular valve assembly, consistent with embodiments of the present disclosure.

FIG. 1 is a schematic example of a modular valve assembly 100. As shown, the modular valve assembly 100 includes an inlet endplate 102, an outlet endplate 104, a first flow fixture 106, a second flow fixture 108, and an expansion coupling 110. The first and second flow fixtures 106 and 108 are disposed between the inlet and outlet endplates 102 and 104. The expansion coupling 110 is disposed between the first and second flow fixtures 106 and 108. The inlet endplate 102 includes an inlet coupling 112 configured to couple to a plumbing system (e.g., a clean water supply system) of a building. The outlet endplate 104 includes an outlet coupling 114 configured to couple to the plumbing system of the building. The inlet coupling 112 is fluidly coupled to the outlet coupling 114 such that a flow path 116 extends from the inlet coupling 112 through the first flow fixture 106, the expansion coupling 110, and the second flow fixture 108, and out of the outlet coupling 114. In other words, the first flow fixture 106, the expansion coupling 110, and the second flow fixture 108 cooperate to fluidly couple the inlet coupling 112 with the outlet coupling 114.

The first and second flow fixtures 106 and 108 may be configured to move (e.g., slidingly and/or pivotally) between a flow position and a maintenance position. For example, compression of the expansion coupling 110 can be configured to allow at least one of the first and/or second flow fixture 106 and/or 108 to be moved from the flow position towards the maintenance position, interrupting the flow path 116. When in the flow position, the first and second flow fixtures 106 and 108 are fluidly coupled to the inlet and outlet couplings 112 and 114 such that the flow path 116 extends through the modular valve assembly 100. When in the maintenance position, the first and second flow fixtures 106 and 108 are fluidly decoupled from the inlet and outlet couplings 112 and 114 such that the flow path 116 no longer extends through the modular valve assembly 100. When the first and second flow fixtures 106 and 108 are in the maintenance position, the first and/or second flow fixtures 106 and/or 108 may be repaired and/or replaced. In one example, at least one of the first and/or second flow fixtures 106 and/or 108 may be replaced with a fixture having the same or different properties.

The modular valve assembly 100 may further include a retention bracket 118. The retention bracket 118 is configured to couple (e.g., removably couple) to each of the inlet endplate 102 and the outlet endplate 104 such that each of the first flow fixture 106, the expansion coupling 110, and the second flow fixture 108 are selectively retained between the endplates 102 and 104. The retention bracket 118 can be configured to not interfere with the transition of the first and second flow fixtures 106 and 108 between the flow position and the maintenance position.

The expansion coupling 110 may be configured to be moved between an expanded position and a compressed position. When the expansion coupling 110 is in the expanded position (or a partially expanded position), movement of one or more of the first and/or second flow fixtures 106 and/or 108 from the flow position towards the maintenance position may be restricted and/or prevented (e.g., application of a force by a user on the first and/or second flow fixtures 106 and/or 108 may be insufficient to move the first and/or second flow fixtures 106 and/or 108). When in the expansion coupling 110 is in the compressed position (or a partially compressed position), movement of one or more of the first and/or second flow fixtures 106 and/or 108 may be permitted (e.g., in response to a user applied force). Examples of the expansion coupling 110 may include, but are not limited to, a telescopic expansion joint, a compressible and/or expandible body (e.g., in the form of a bellows), and/or any other kind of expandible coupling.

While the modular valve assembly 100 is shown as including only the first and second flow fixtures 106 and 108, the modular valve assembly 100 may include additional (or fewer) flow fixtures. In some instances, additional expansion couplings 110 may be provided. For example, each flow fixture may be separated from another flow fixture by a corresponding expansion coupling 110. The flow fixtures 106 and 108 may be of the same type or may be different types.

Figure 2:
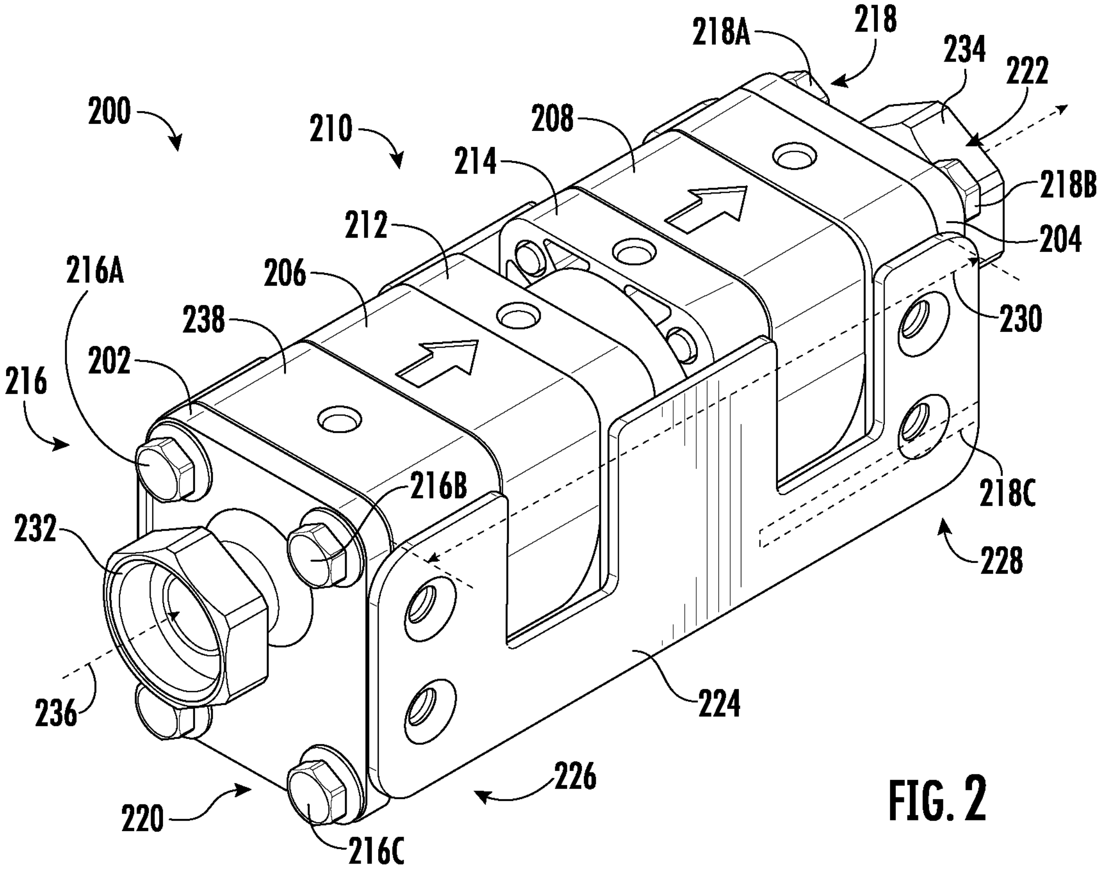
FIG. 2 is a perspective view of a modular valve assembly in a flow position, consistent with embodiments of the present disclosure.

FIG. 2 shows a perspective view of a modular valve assembly 200, which is an example of the modular valve assembly 100 of FIG. 1. As shown, the modular valve assembly 200 includes an inlet endplate 202, an outlet endplate 204, a first fixture frame 206 configured to receive a first flow fixture, a second fixture frame 208 configured to receive a second flow fixture, and an expansion coupling 210. The first and second fixture frames 206 and 208 are disposed between the inlet and outlet endplates 202 and 204 and the expansion coupling 210 is disposed between the first and second fixture frames 206 and 208.

The expansion coupling 210 includes an inlet portion 212 and an outlet portion 214, the inlet portion 212 and outlet portion 214 are movable relative to each other to transition the expansion coupling between the expanded and compressed positions. The inlet portion 212 is configured to be coupled to the inlet endplate 202 using one or more inlet fasteners 216 (e.g., bolts, screws, and/or the like). The outlet portion 214 is configured to be coupled to the outlet endplate 204 using one or more outlet fasteners 218 (e.g., bolts, screws, and/or the like). In other words, the one or more inlet fasteners 216 may generally be described as being configured to couple the inlet endplate 202 to the expansion coupling 210 and the one or more outlet fasteners 218 may generally be described as being configured to couple the outlet endplate to the expansion coupling 210.

As the inlet fasteners 216 and outlet fasteners 218 are tightened, the inlet portion 212 and outlet portion 214 of the expansion coupling 210 are moved towards the inlet endplate 202 and the outlet endplate 204, respectively (transitioning the expansion coupling 210 towards the expanded position). Movement of the inlet and outlet portions 212 and 214 towards the inlet and outlet endplates 202 and 204, respectively, causes a compressive force to be exerted on the first and second fixture frames 206 and 208, respectively. In other words, the endplates 202 and 204 are configured to cooperate with the expansion coupling 210 to selectively exert a clamping (compressive) force on the first and second fixture frames 206 and 208, selectively retaining the first and second fixture frames 206 and 208 in a flow position (FIG. 2). Coupling the endplates 202 and 204 to the expansion coupling 210 (instead of to each other) using the fasteners 216 and 218 allows for selective application of the compressive force on each of the fixture frames 206 and 208 through loosening (or tightening) corresponding ones of the fasteners 216 or 218. If the endplates 202 and 204 were coupled to each other via the fasteners 216 and 218, loosening (or tightening) the fasteners 216 and 218 would adjust the compressive force on both of the fixtures frames 206 and 208 at the same time.

Figure 3:
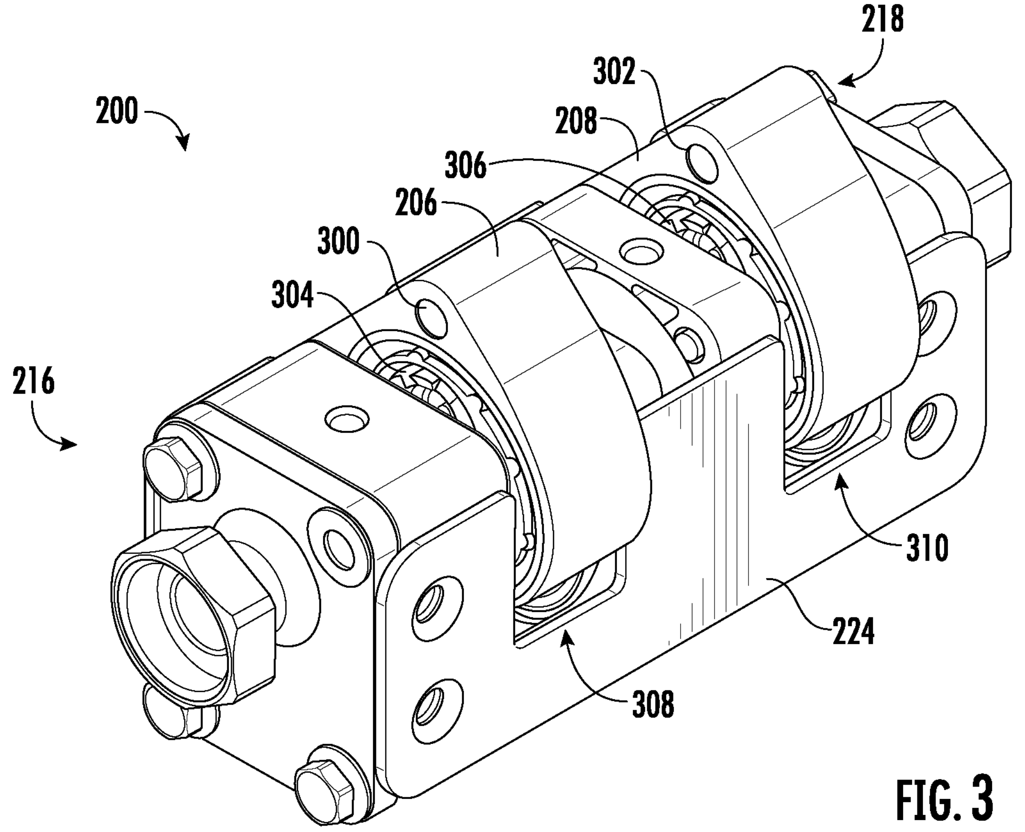
FIG. 3 is a perspective view of the modular valve assembly of FIG. 2 transitioning towards a maintenance position, consistent with embodiments of the present disclosure.

The inlet fasteners 216 include an inlet pivot fastener 216A and an inlet release fastener 216B. The inlet pivot fastener 216A and the inlet release fastener 216B are configured to passthrough the inlet endplate 202 and first fixture frame 206 and couple to the expansion coupling 210 (e.g., the inlet portion 212). The inlet release fastener 216B may be removable from the expansion coupling 210 (e.g., the inlet portion 212) and from the first fixture frame 206 such that the first fixture frame 206 is pivotable towards a maintenance position (e.g., as shown in FIG. 3). In some instances, the inlet release fastener 216B may be removable from the inlet endplate 202. The first fixture frame 206, when pivoting to the maintenance position, is configured to pivot about the inlet pivot fastener 216A. As such, the inlet release fastener 216B and the inlet pivot fastener 216A may be generally described as being configured to cooperate to allow for the selective pivotal movement of the first fixture frame 206.

The outlet fasteners 218 may include an outlet pivot fastener 218A and an outlet release fastener 218B. The outlet pivot fastener 218A and the outlet release fastener 218B are configured to passthrough the outlet endplate 204 and the second fixture frame 208 and couple to the expansion coupling 210 (e.g., the outlet portion 214). The outlet release fastener 218B may be removable from the expansion coupling 210 (e.g., the outlet portion 214) and from the second fixture frame 208 such that the second fixture frame 208 is pivotable towards a maintenance position (e.g., as shown in FIG. 3). In some instances, the outlet release fastener 218B may be removable from the outlet endplate 204. The second fixture frame 208, when pivoting to the maintenance position, is configured to pivot about the outlet pivot fastener 218A. As such, the outlet release fastener 218B and the outlet pivot fastener 218A may be generally described as being configured to cooperate to allow for the selective pivotal movement of the second fixture frame 208. In other words, in view of the above, removal of the inlet and outlet release fasteners 216B and 218B allows the first and second fixture frames 206 and 208 to pivot about the inlet and outlet pivot fasteners 216A and 218B, respectively.

While the terms release fastener and pivot fastener are used in relation to the inlet and outlet fasteners 216A-B and 218A-B, it should be appreciated that any of the inlet and outlet fasteners 216A-B or 218A-B may be a release or a pivot fastener. For example, fasteners 216B and/or 218B may be a pivot fastener and fasteners 216A and/or 218A may be a release fastener. In other words, the user may remove either of the fasteners 216A or 216B and either of the fasteners 218A or 218B and pivot about the remaining fastener based on whichever fastener is easiest to remove within the installation environment. In some instances, each of the fasteners 216A-B and/or 218A-B may be removed such that the corresponding fixture frame 206 and 208 may be removed (e.g., slidably) from the modular valve assembly 200. Such a configuration may encourage, for example, an easier repair or replacement of the first and/or second fixture frame 206 and/or 208 and/or repair or replacement of a flow fixture within the first and/or second fixture frames 206 and/or 208.

The inlet fasteners 216 may include one or more inlet clamping fasteners 216C. The inlet clamping fasteners 216C are configured to passthrough the inlet endplate 202 and couple to the expansion coupling 210 (e.g., the inlet portion 212) without passing through the first fixture frame 206. Tightening or loosening of the inlet clamping fasteners 216C adjusts and/or balances a compressive force applied to the first fixture frame 206. Each of the inlet fasteners 216 include an inlet plate engaging end 220 configured to engage the inlet endplate 202 such that, when tightened, a compressive force is exerted on the first fixture frame 206.

The outlet fasteners 218 may include one or more outlet clamping fasteners 218C (shown schematically in hidden lines). The outlet clamping fasteners 218C are configured to passthrough the outlet endplate 204 and couple to the expansion coupling 210 (e.g., the outlet portion 214) without passing through the second fixture frame 208. Tightening or loosening of the outlet clamping fasteners 218C adjusts and/or balances a compressive force applied to the second fixture frame 208. Each of the outlet fasteners 218 include an outlet plate engaging end 222 configured to engage the outlet endplate 204 such that, when tightened, a compressive force is exerted on the second fixture frame 208.

As further shown, the modular valve assembly 200 includes one or more retention brackets 224. The one or more retention brackets 224 include an inlet coupling end 226 and an outlet coupling end 228. The inlet coupling end 226 is configured to couple to the inlet endplate 202 and the outlet coupling end 228 is configured to couple to the outlet endplate 204. The retention bracket 224 can be configured to extend over at least a portion of one or more of the first fixture frame 206, the second fixture frame 208 and/or the expansion coupling 210 without fixedly coupling to (e.g., to allow movement of) the fixture frames 206 and 208 and the expansion coupling 210.

The one or more retention brackets 224, when coupled to the inlet and outlet endplates 202 and 204, are configured to maintain the inlet and outlet endplates 202 and 204 at a fixed plate separation distance 230. As such, when the inlet and outlet fasteners 216 and 218 are tightened, opposing forces are exerted on the expansion coupling 210, which cause the inlet and outlet portions 212 and 214 of the expansion coupling 210 to move relative to each other. Movement of the inlet and outlet portions 212 and 214 causes a compressive force to be exerted on the first and second fixture frames 206 and 208, respectively.

In some instances, each of the inlet fasteners 216 may be removed from the first fixture frame 206 (e.g., and in some instances from the inlet endplate 202) and the one or more retention brackets 224 may be decoupled from the inlet endplate 202, which allows for the modular valve assembly 200 to be at least partially disassembled. Such a configuration may, for example, encourage an easier repair or replacement of the first fixture frame 206 and/or the repair or replacement of a flow fixture within the first fixture frame 206. Additionally, or alternatively, each of the outlet fasteners 218 may be removed from the second fixture frame 208 (e.g., and in some instances from the outlet endplate 204) and the one or more retention brackets 224 may be decoupled from the outlet endplate 204, which allows for the modular valve assembly 200 to be at least partially disassembled. Such a configuration may, for example, encourage an easier repair or replacement of the second fixture frame 208 and/or the repair or replacement of a flow fixture within the second fixture frame 208.

As further shown, the inlet endplate 202 includes an inlet coupling 232 and the outlet endplate 204 includes an outlet coupling 234. The inlet and outlet couplings 232 and 234 are configured to couple the modular valve assembly 200 to a plumbing system (e.g., a clean water system of a building). When the first and second fixture frames 206 and 208 are in the flow position, a flow path 236 is configured to extend from the inlet coupling 232 through the modular valve assembly 200 and out of the outlet coupling 234. When the first and/or second fixtures frames 206 and 208 are in the maintenance position, the flow path 236 is interrupted such that it does not extend from the inlet coupling 232 through the modular valve assembly 200 and out of the outlet coupling 234. In some instances, the modular valve assembly 200 may include one or more additional fixture frames 238 disposed between a corresponding endplate 202 or 204 and the expansion coupling 210. The one or more additional fixture frames 238 may be moveable (e.g., between a maintenance position and a flow position) or fixed relative to the corresponding endplate 202 or 204. The one or more additional fixture frames 238 are configured to receive a corresponding additional fixture.

FIG. 3 shows a perspective view of the modular valve assembly 200, wherein the first and second fixture frames 206 and 208 are pivoting from the flow position and towards the maintenance position. As shown, each of the first and second fixture frames 206 and 208 include fastener passthroughs 300 and 302, respectively. The fastener passthroughs 300 and 302 are configured to receive a corresponding one of the inlet and outlet fasteners 216 (e.g., 216A and 216B) and 218 (e.g., 218A and 218B), respectively. In other words, one or more of the inlet and outlet fasteners 216 and 218 may generally be described as extending through the first and second fixture frames 206 and 208, respectively. When each fixture frame 206 and 208 includes a plurality of fastener passthroughs 300 and 302, respectively, and one of the inlet and outlet fasteners 216 and 218 is removed from a corresponding fastener passthrough 300 and 302, the corresponding fixture frame 206 or 208 is able to pivot about the other inlet or outlet fastener 216 or 218.

As the first and second fixture frames 206 and 208 move towards the maintenance position, first and second fixtures 304 and 306, respectively, are exposed. The first fixture 304 being coupled (e.g., removably coupled) to the first fixture frame 206 and the second fixture 306 being coupled (e.g., removably coupled) to the second fixture frame 208. The first and second fixtures 304 and 306 are configured to control a flow of a fluid (e.g., water). Non-limiting examples of the first and second fixtures 304 and 306 may include one or more of check valves, pressure reducing valves, pressure relief valves, reduced pressure zones, cutoff valves, strainers, combinations thereof, and the like.

As further shown in FIG. 3, the one or more retention brackets 224 include first and second fixture cutouts 308 and 310 that correspond to the first and second fixture frames 206 and 208, respectively. As the first and second fixture frames 206 and 208 are pivoted towards the maintenance position, the first and second fixture frames 206 and 208 (and the first and second fixtures 304 and 306) passthrough a corresponding fixture cutout 308 or 310. As such, the one or more retention brackets 224 may be generally described as being configured to not interfere with the pivotal movement of the fixture frames 206 and 208 between the flow and maintenance positions.

Figure 4:
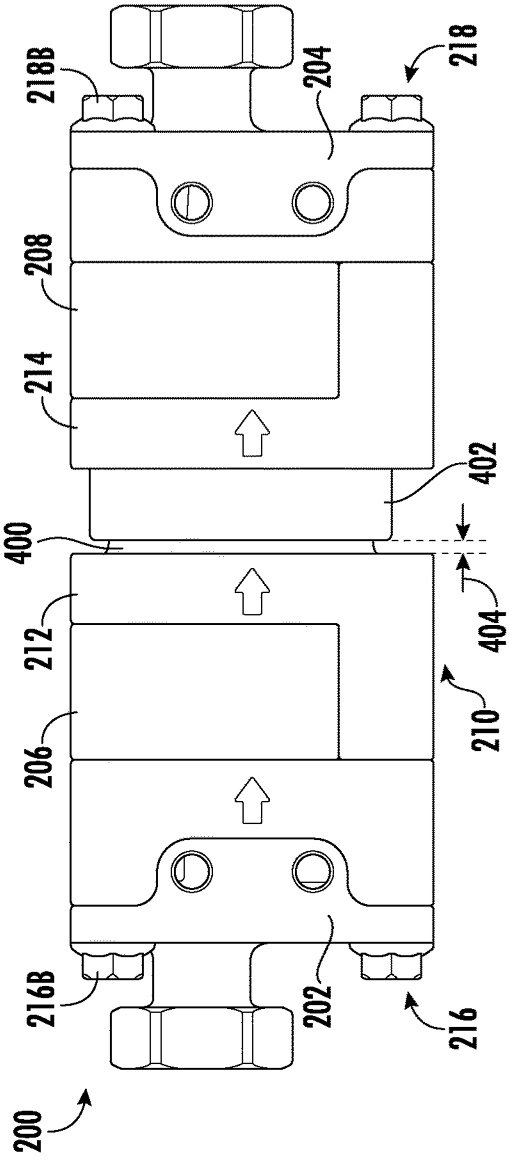
FIG. 4 is a side view of the modular valve assembly of FIG. 2 in the flow position, with one or more components removed therefrom for purposes of clarity, consistent with embodiments of the present disclosure.
Figure 5:
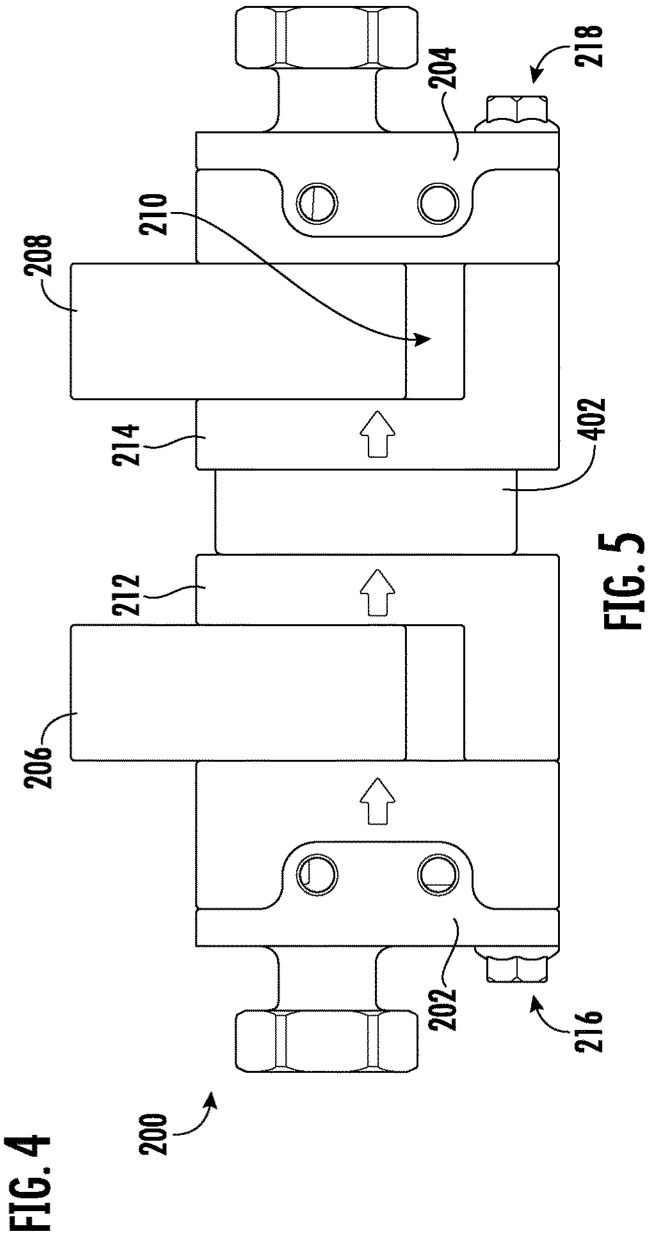
FIG. 5 is a side view of the modular valve assembly of FIG. 2 transitioning towards the maintenance position, with one or more components removed therefrom for purposes of clarity, consistent with embodiments of the present disclosure.

FIG. 4 shows a side view of the modular valve assembly 200 with the one or more retention brackets 224 removed therefrom and with the first and second fixture frames 206 and 208 in the flow position. FIG. 5 shows another side view of the modular valve assembly 200 with the one or more retention brackets 224 removed therefrom and with the first and second fixture frames 206 and 208 in the maintenance position.

As shown, the expansion coupling 210 is configured to transition between an expanded position (FIG. 4) and a compressed position (FIG. 5). When the first and second fixture frames 206 and 208 are in the flow position and after the inlet and outlet fasteners 216 and 218 are tightened, the expansion coupling 210 is in the expanded position such that the first and second fixture frames 206 and 208 are compressed between the expansion coupling 210 and the inlet and outlet endplates 202 and 204, respectively. When the inlet and outlet fasteners 216 and 218 are loosened, the expansion coupling 210 is capable of transitioning to the compressed position (e.g., in response to a user exerted force), which releases (e.g., reduces or removes) a compressive force on the first and second fixture frames 206 and 208, allowing for movement of the first and second fixture frames 206 and 208. For example, when the release fasteners 216B and 218B are removed from a corresponding fastener passthrough 300 or 302 (FIG. 3), the release of the compressive force on the first and second fixture frames 206 and 208 allows the first and second fixture frames 206 and 208 to be pivoted towards the maintenance position (e.g., in response to a user exerted force). By having the fasteners 216 and 218 couple the endplates 202 and 204 to the expansion coupling 210 (as opposed to directly to each other), one of the fixture frames 206 or 208 may be selectively pivoted to the maintenance position independent of the compressive force exerted on the other of the fixture frames 206 or 208. For example, in some instances, only the inlet or outlet fasteners 216 or 218 may be loosened, allowing for movement of only one of the first or second fixtures frames 206 or 208. In this example, only one of the release fasters 216B or 218B may be removed to allow only one of the first or second fixture frame 206 or 208 to pivot towards the maintenance position.

As shown in FIGS. 4 and 5, when the expansion coupling 210 is transitioned between the expanded and compressed positions, the inlet portion 212 and the outlet portion 214 of the expansion coupling 210 move relative to each other. For example, the inlet portion 212 may include an inlet protrusion 400 and the outlet portion 214 may include an outlet receptacle 402 configured to slidably receive at least a portion of the inlet protrusion 400. As the expansion coupling 210 transitions from the expanded to the compressed position, the inlet protrusion 400 slides further into the outlet receptacle 402. By way of further example, the inlet portion 212 may include an inlet receptacle and the outlet portion 214 may include an outlet protrusion configured to be slidably received within the inlet receptacle. In other words, one of the inlet portion 212 or the outlet portion 214 includes a receptacle or a protrusion and the other of the inlet portion 212 or the outlet portion 214 includes the other of the receptacle or the protrusion.

As the inlet portion 212 and the outlet portion 214 move relative to each other, an expansion gap 404 extending between the inlet portion 212 and the outlet portion 214 increases or decreases. For example, as the expansion coupling 210 transitions to the compressed position, the expansion gap 404 decreases. By way of further example, as the expansion coupling 210 transitions to the expanded position, the expansion gap 404 increases. In some instances, and by way of further example, the expansion coupling 210 may be transitioned to a partially expanded (or partially compressed) position by moving only one of the inlet portion 212 relative to the outlet portion 214 or by moving only the outlet portion 214 relative to the inlet portion 212.

Figure 6:
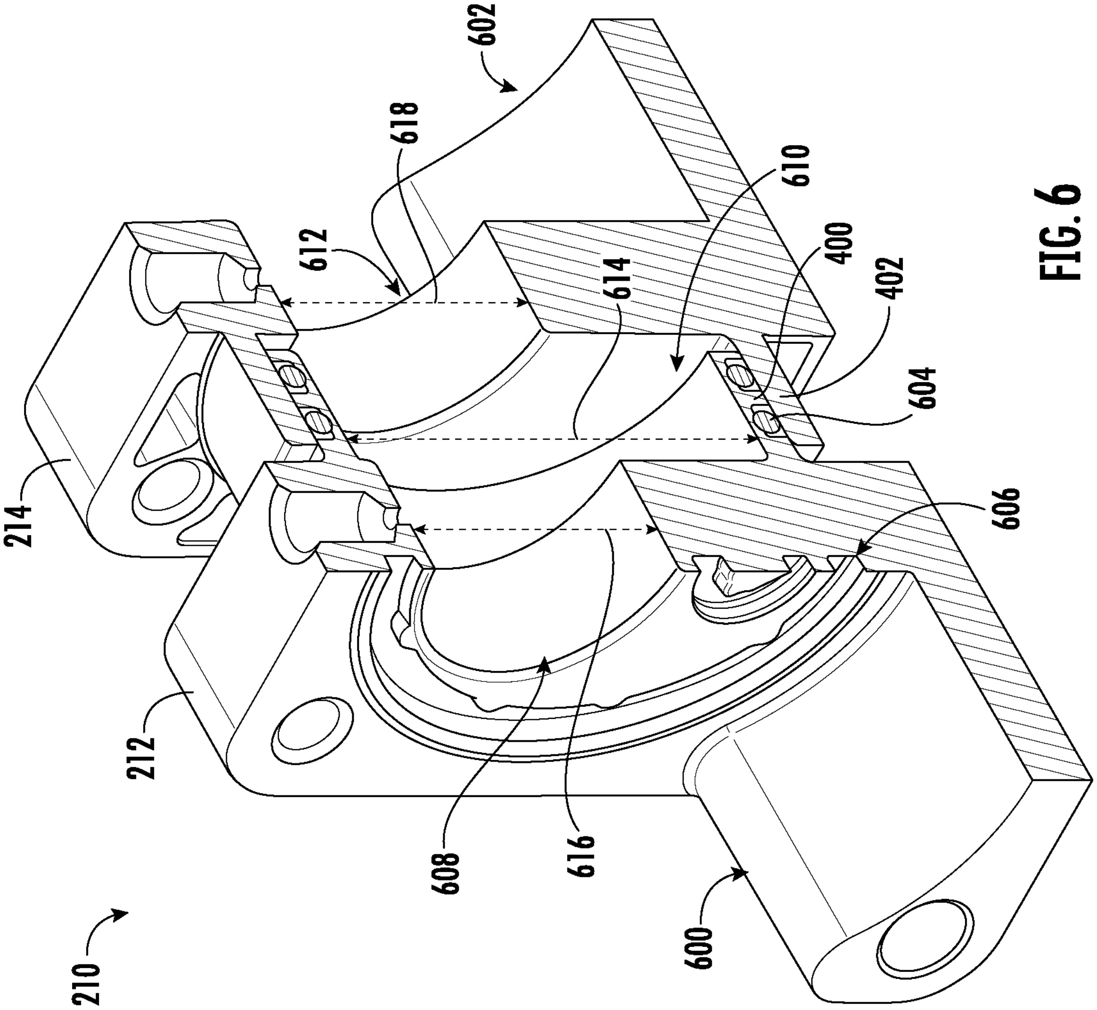
FIG. 6 is a cross-sectional perspective view of an expansion coupling of the modular valve assembly of FIG. 2, consistent with embodiments of the present disclosure.

FIG. 6 shows a cross-sectional perspective view of the expansion coupling 210. As shown, the inlet portion 212 can include an inlet receptacle 600 configured to receive a portion of the first fixture frame 206 (FIG. 2). The inlet receptacle 600 may be shaped to allow the pivotal movement of the first fixture frame 206 relative to the inlet portion 212. For example, and as shown, the inlet receptacle 600 may have an arcuate shape. The shape of the inlet receptacle 600 may correspond (e.g., be complementary) to a shape of the portion of the first fixture frame 206 received within the inlet receptacle 600.

The outlet portion 214 can include an outlet receptacle 602 configured to receive a portion of the second fixture frame 208 (FIG. 2). The outlet receptacle 602 may be shaped to allow the pivotal movement of the second fixture frame 208 relative to the outlet portion 214. For example, and as shown, the outlet receptacle 602 may have an arcuate shape. The shape of the outlet receptacle 602 may correspond (e.g., be complementary) to a shape of the portion of the second fixture frame 208 received within the outlet receptacle 602.

As shown, the inlet protrusion 400 may include one or more protrusion seals 604 configured to sealing engage with a portion of the outlet receptacle 402. The one or more protrusion seals 604 are configured to allow the inlet protrusion 400 and the outlet receptacle 402 to move (e.g., slide) relative to each other while maintaining a seal. In some instances, one or more frame seals may be disposed within a corresponding one or more seal receptacles 606 in the inlet portion 212 and/or the outlet portion 214. The one or more frame seals are configured to sealingly engage a corresponding one of the first or second fixture frame 206 or 208.

As further shown, the inlet portion 212 includes an inlet fluid passthrough 608 fluidly coupled to a transition chamber

610 and the outlet portion 214 includes an outlet fluid passthrough 612 fluidly coupled to the transition chamber 610. The transition chamber 610 may be defined, at least partially, within the inlet protrusion 400. A chamber height 614 (e.g., diameter) of the transition chamber 610 may be greater than an inlet passthrough height 616 (e.g., diameter) of the inlet fluid passthrough 608 and/or greater than an outlet passthrough height 618 (e.g., diameter) of the outlet fluid passthrough 612.

Figure 7:
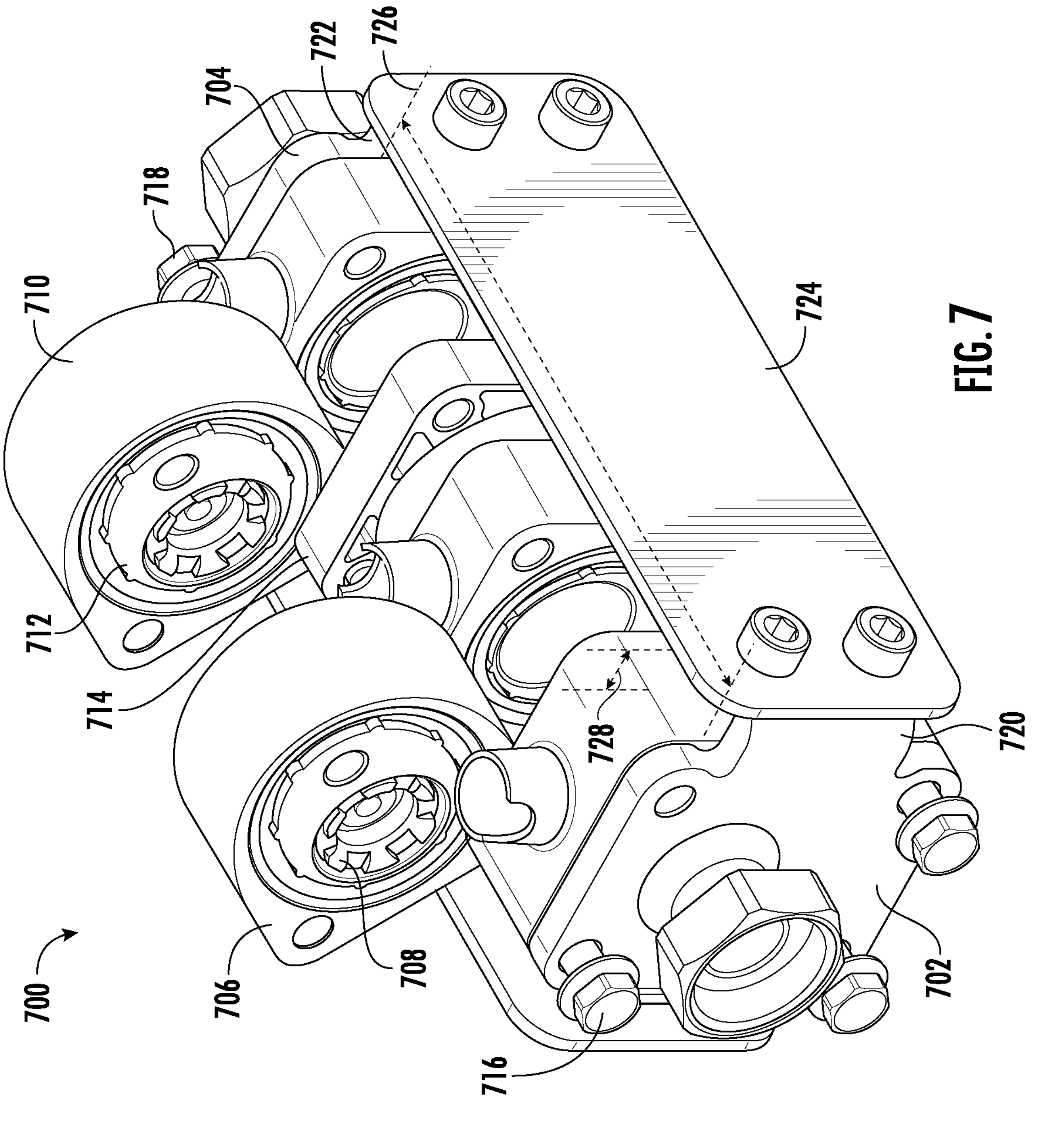
FIG. 7 is a perspective view of another modular valve assembly, consistent with embodiments of the present disclosure.

FIG. 7 shows a perspective view of a modular valve assembly 700, which is an example of the modular valve assembly 100 of FIG. 1. Similar to the modular valve assembly 200 of FIG. 2, the modular valve assembly 700 includes an inlet endplate 702, an outlet endplate 704, a first fixture frame 706 configured to receive a first flow fixture 708, a second fixture frame 710 configured to receive a second flow fixture 712, and an expansion coupling 714. The first and second fixture frames 706 and 710 are disposed between the inlet and outlet endplates 702 and 704 and the expansion coupling 714 is disposed between the first and second fixture frames 706 and 710. The first and second fixture frames 706 and 710 are movable (e.g., pivotable) between a flow position and a maintenance position. FIG. 7 shows the first and second fixture frames 706 and 710 in the maintenance position.

The modular valve assembly 700 also includes a set of inlet fasteners 716 and a set of outlet fasteners 718. The set of inlet fasteners 716 couple the inlet endplate 702 to the expansion coupling 714 and the set of outlet fasteners 718 couple the outlet endplate 704 to the expansion coupling 714. A first and second inlet fastener of the set of inlet fasteners 716 extend through the first fixture frame 706, wherein removal of one of the first and second inlet fasteners and the loosening of the remaining inlet fasteners of the set of inlet fasteners 716 allows the first fixture frame 706 to be pivoted about the other of the first and second inlet fasteners between the flow position towards maintenance position. A first and second outlet fastener of the set of outlet fasteners 718 extend through the second fixture frame 710, wherein removal of one of the first and second outlet fasteners and the loosening of the remaining outlet fasteners of the set of outlet fasteners 718 allows the second fixture frame 710 to be pivoted about the other of the first and second outlet fasteners from the flow position towards the maintenance position.

The expansion coupling 714, similar to the expansion coupling 210, is configured to transition between an expanded and a compressed position. When the expansion coupling 714 is in (or transitioning towards) the expanded position or a partially expanded position, the expansion coupling 714 cooperates with the inlet and/or outlet endplate 702 and/or 704 to exert a corresponding compressive (or clamping) force on the first and/or second fixture frames 706 and/or 710 in response to the inlet and/outlet sets of fasteners 716 and/or 718 being tightened. The expansion coupling 714 is capable of being transitioned to the compressed position or a partially compressed position in response to one or more of the inlet and/or outlet sets of fasteners 716 and/or 718 being loosened, releasing (e.g., reducing or removing) the compressive force. With release of the compressive force, the first and/or second fixture frames 706 and/or 710 may be pivoted from the flow position to the maintenance position (e.g., in response to a user applied force).

As shown, each of the inlet and outlet endplates 702 and 704 include a bracket standoff 720 and 722, respectively. The bracket standoffs 720 and 722 are configured to couple to a retention bracket 724. The retention bracket 724 is configured to couple the inlet and outlet endplates 702 and 704 together such that a plate separation distance 726 extending between the inlet and outlet endplates 702 and 704 is fixed. The bracket standoffs 720 and 722 are configured separate the retention bracket 724 from the first and second fixture frames 706 and 710 by a bracket-frame separation distance 728. The bracket-frame separation distance 728 is configured such that the retention bracket 724 does not interfere with pivotal movement of the first and second fixture frames 706 and 710 when moving between the flow position and the maintenance position. In some instances, the retention bracket 724 may include one or more fixture cutouts (e.g., similar to the fixture cutouts 308 and 310 of FIG. 3), which may allow bracket-frame separation distance 728 to be reduced.

Figure 8:
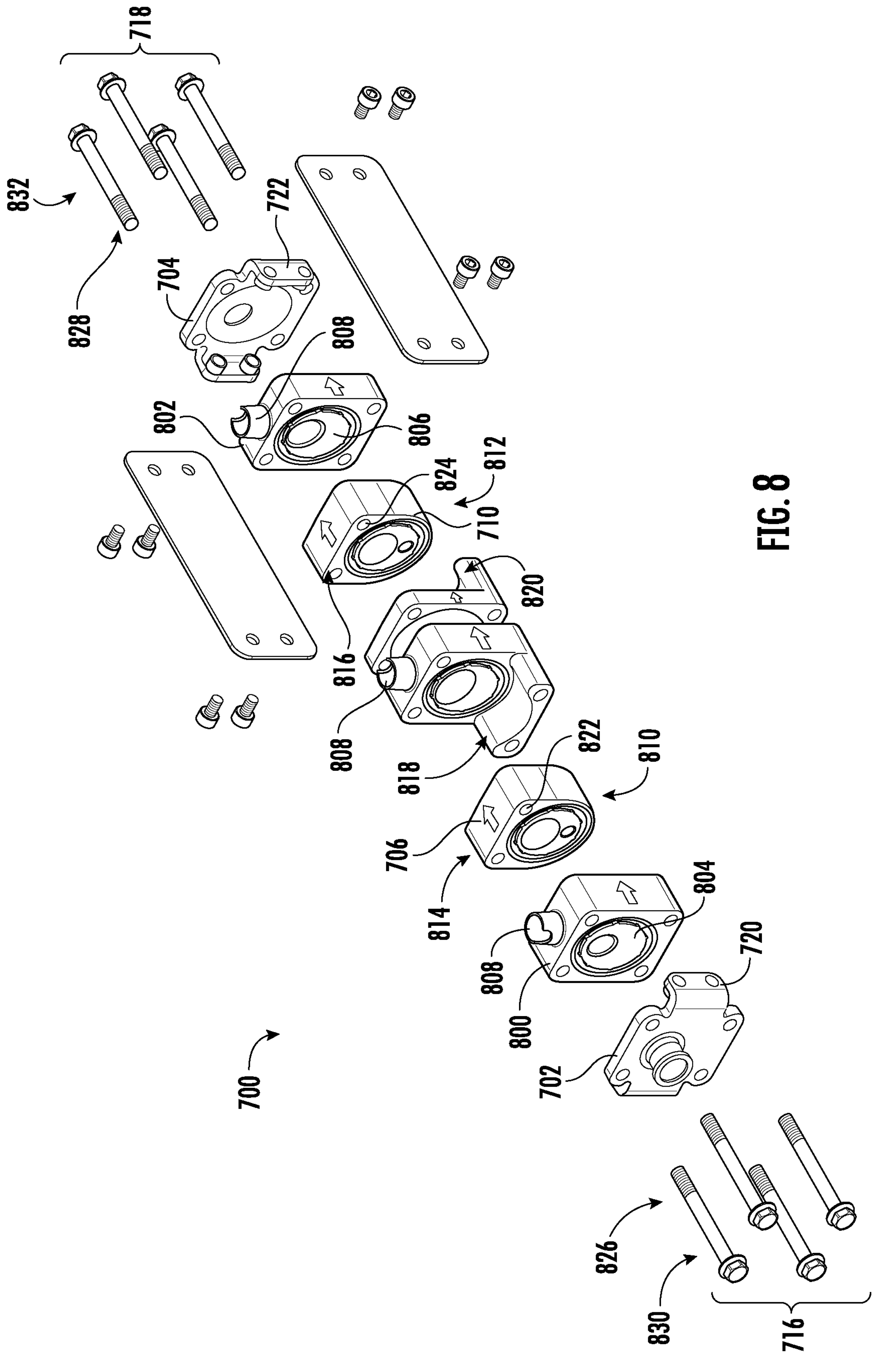
FIG. 8 is an exploded perspective view of the modular valve assembly of FIG. 7, consistent with embodiments of the present disclosure.

FIG. 8 shows an exploded view of the modular valve assembly 700. As shown, the modular valve assembly 700 may further include one or more additional inlet fixture frames 800 and one or more additional outlet fixture frames 802. The additional inlet and outlet fixture frames 800 and 802 may include one or more additional fixtures 804 and 806, respectively. The one or more additional inlet fixture frames 800 may be disposed between the first fixture frame 706 and the inlet endplate 702. The one or more additional inlet fixture frames 800 may be fixed (e.g., non-pivotal) relative to the inlet endplate 702. The one or more additional outlet fixture frames 802 may be disposed between the second fixture frame 710 and the outlet endplate 704. The one or more additional outlet fixture frames 802 may be fixed (e.g., non-pivotal) relative to the outlet endplate 704. Additionally or alternatively, one or more of the one or more additional inlet and outlet fixture frames 800 and/or 802 may be configured to pivot relative to the inlet and/or outlet endplates 702 and/or 704 between a flow position and a maintenance position.

As shown, each bracket standoff 720 and 722 may be configured to extend around at least a portion of a corresponding one of the one or more additional inlet and outlet fixture frames 800 and 802. As further shown, one or more of the additional inlet fixture frame 800, the additional outlet fixture frame 802, and/or the expansion coupling 714 may include a test cock 808.

As further shown, each of the first and second fixture frames 706 and 710 include an arcuate surface 810 and 812 and one or more planar surface 814 and 816. The arcuate surfaces 810 and 812 are configured to be at least partially received within corresponding receptacles 818 and 820 within the expansion coupling 714. The receptacles 818 and 820 may have an arcuate shape that corresponds to the arcuate surfaces 810 and 812 of the first and second fixture frames 706 and 710, respectively. For example, the receptacles 818 and 820 and the arcuate surfaces 810 and 812 may have a radius of curvature that allows for the pivotal movement of the first and second fixture frames 706 and 710 between the flow position and the maintenance position.

The first and second fixture frames 706 and 710 each include a plurality of fastener passthroughs 822 and 824 for receiving a corresponding one of the set of inlet fasteners and set of outlet fasteners 716 and 718, respectively. The fasteners of the sets of inlet and outlet fasteners 716 and 718 may include threaded regions 826 and 828 and unthreaded regions 830 and 832. The threaded regions 826 and 828 are configured to threadably couple to the expansion coupling 714. A length of the unthreaded regions 830 and 832 may be greater than (e.g., at least two times greater than) a length of the threaded regions 826 and 828.

As shown, each of the inlet set and outlet set of fasteners 716 and 718 include four fasteners, wherein two fasteners pass through corresponding fastener passthroughs 822 and 824 and two fasteners bypass (or do not pass through) the first and second fixture frames 706 and 710. When the additional inlet and outlet fixture frames 800 and 802 are included, each of the four fasteners of the inlet set and outlet set of fasteners 716 and 718 may pass through the additional inlet and outlet fixture frames 800 and 802.

As should be appreciated in view of the above disclosure, the modular valve assembly 200 is similar to the modular valve assembly 700. As such, one or more components (e.g., fixture frames, expansion couplings, endplates, retention brackets, and/or any other component) from one of the modular valve assembly 200 or 700 may be readily used in the other modular valve assembly 200 or 700. As such, a detailed discussion of one or more components in the context of one of the modular valve assemblies 200 or 700 may have been omitted for the sake of brevity with the understanding that a similar component was described in the context of the other of the modular valve assemblies 200 or 700.

An example of a modular valve assembly, consistent with the present disclosure, may include an inlet endplate, an outlet endplate, a first flow fixture disposed between the inlet endplate and the outlet endplate, a second flow fixture disposed between the inlet endplate and the outlet endplate, the first flow fixture and the second flow fixture movable between a flow position and a maintenance position, and an expansion coupling disposed between the first flow fixture and the second flow fixture, the expansion coupling being configured to move between an expanded position and a compressed position. When the expansion coupling is in the compressed position, the first flow fixture and the second flow fixture may be moveable from the flow position towards the maintenance position. When the expansion coupling is in the expanded position, movement of first flow fixture and the second flow fixture from the flow position towards the maintenance position may be restricted.

In some instances, the first flow fixture and the second flow fixture may pivot between the flow position and the maintenance position. In some instances, the modular valve assembly may further include a first fixture frame and a second fixture frame, the first fixture being coupled to the first fixture frame and the second fixture being coupled to the second fixture frame. In some instances, the modular valve assembly may include a plurality of inlet fasteners and a plurality of outlet fasteners, the plurality of inlet fasteners coupling the inlet endplate to the expansion coupling and extending through the first fixture frame, the plurality of outlet fasteners coupling the outlet endplate to the expansion coupling and extending through the second fixture frame. In some instances, the plurality of inlet fasteners may include an inlet pivot fastener and an inlet release fastener and the plurality of outlet fasteners may include an outlet pivot fastener and an outlet release fastener, removal of the inlet and outlet release fasteners allowing the first fixture frame and the second fixture frame to pivot about the inlet and outlet pivot fasteners, respectively. In some instances, the modular valve assembly may further include a retention bracket coupled to the inlet endplate and the outlet endplate. In some instances, the retention bracket may be configured to not interfere with the transition of the first flow fixture and the second flow fixture between the flow position and the maintenance position. In some instances, the retention bracket may include one or more cutouts through which the first flow fixture and the second flow fixture pass when transitioning between the flow position and the maintenance position. In some instances, the inlet endplate and the outlet endplate may each include a bracket standoff to which the retention bracket is coupled. In some instances, the expansion coupling may include an inlet portion and an outlet portion, the inlet portion and the outlet portion being movable relative to each other to transition the expansion coupling between the expanded position and the compressed position. In some instances, a plurality of inlet fasteners may couple the inlet endplate to the inlet portion of the expansion coupling and a plurality of outlet fasteners may couple the outlet endplate to the outlet portion of the expansion coupling. In some instances, tightening of the plurality of inlet fasteners and the plurality of outlet fasteners may transition the expansion coupling from the compressed position towards the expanded position.

Another example of a modular valve assembly, consistent with the present disclosure, may include an inlet endplate having an inlet coupling, an outlet endplate having an outlet coupling, a first flow fixture disposed between the inlet endplate and the outlet endplate, a second flow fixture disposed between the inlet endplate and the outlet endplate, the first flow fixture and the second flow fixture movable between a flow position and a maintenance position, and an expansion coupling disposed between the first flow fixture and the second flow fixture such that, when the first flow fixture and the second flow fixture are in the flow position, a flow path extends from the inlet coupling through each of the first flow fixture, the second flow fixture, and the expansion coupling and out of outlet coupling, wherein compression of the expansion coupling allows at least one of the first flow fixture or the second flow fixture to be moved towards the maintenance position, interrupting the flow path.

In some instances, the modular valve assembly may further include a first fixture frame and a second fixture frame, the first fixture being coupled to the first fixture frame and the second fixture being coupled to the second fixture frame. In some instance, the modular valve assembly may further include a plurality of inlet fasteners and a plurality of outlet fasteners, the plurality of inlet fasteners coupling the inlet endplate to the expansion coupling and extending through the first fixture frame, the plurality of outlet fasteners coupling the outlet endplate to the expansion coupling and extending through the second fixture frame. In some instances, the plurality of inlet fasteners may include an inlet pivot fastener and an inlet release fastener and the plurality of outlet fasteners may include an outlet pivot fastener and an outlet release fastener, removal of the inlet and outlet release fasteners allowing the first fixture frame and the second fixture frame to pivot about the inlet and outlet pivot fasteners, respectively. In some instances, the modular valve assembly may further include a retention bracket coupled to the inlet endplate and the outlet endplate. In some instances, the retention bracket may be configured to not interfere with the transition of the first flow fixture and the second flow fixture between the flow position and the maintenance position. In some instances, a plurality of inlet fasteners may couple the inlet endplate to an inlet portion of the expansion coupling and a plurality of outlet fasteners may couple the outlet endplate to an outlet portion of the expansion coupling. In some instances, tightening of the plurality of inlet fasteners and the plurality of outlet fasteners may transition the expansion coupling from a compressed position towards an expanded position.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A modular valve assembly comprising:
- an inlet endplate;
- an outlet endplate;
- a first flow fixture disposed between the inlet endplate and the outlet endplate;
- a second flow fixture disposed between the inlet endplate and the outlet endplate, the first flow fixture and the second flow fixture movable between a flow position and a maintenance position; and
- an expansion coupling disposed between the first flow fixture and the second flow fixture, the expansion coupling being configured to move between an expanded position and a compressed position, wherein:
  - when the expansion coupling is in the compressed position, the first flow fixture and the second flow fixture are moveable from the flow position towards the maintenance position; and
  - when the expansion coupling is in the expanded position, movement of first flow fixture and the second flow fixture from the flow position towards the maintenance position is restricted.

2. The modular valve assembly of claim 1, wherein the first flow fixture and the second flow fixture pivot between the flow position and the maintenance position.

3. The modular valve assembly of claim 1 further comprising a first fixture frame and a second fixture frame, the first fixture being coupled to the first fixture frame and the second fixture being coupled to the second fixture frame.

4. The modular valve assembly of claim 3 further comprising a plurality of inlet fasteners and a plurality of outlet fasteners, the plurality of inlet fasteners coupling the inlet endplate to the expansion coupling and extending through the first fixture frame, the plurality of outlet fasteners coupling the outlet endplate to the expansion coupling and extending through the second fixture frame.

5. The modular valve assembly of claim 4, wherein the plurality of inlet fasteners include an inlet pivot fastener and an inlet release fastener and the plurality of outlet fasteners include an outlet pivot fastener and an outlet release fastener, removal of the inlet and outlet release fasteners allowing the first fixture frame and the second fixture frame to pivot about the inlet and outlet pivot fasteners, respectively.

6. The modular valve assembly of claim 1 further comprising a retention bracket coupled to the inlet endplate and the outlet endplate.

7. The modular valve assembly of claim 6, wherein the retention bracket is configured to not interfere with the transition of the first flow fixture and the second flow fixture between the flow position and the maintenance position.

8. The modular valve assembly of claim 7, wherein the retention bracket includes one or more cutouts through which the first flow fixture and the second flow fixture pass when transitioning between the flow position and the maintenance position.

9. The modular valve assembly of claim 7, wherein the inlet endplate and the outlet endplate each include a bracket standoff to which the retention bracket is coupled.

10. The modular valve assembly of claim 1, wherein the expansion coupling includes an inlet portion and an outlet portion, the inlet portion and the outlet portion being movable relative to each other to transition the expansion coupling between the expanded position and the compressed position.

11. The modular valve assembly of claim 10, wherein a plurality of inlet fasteners couple the inlet endplate to the inlet portion of the expansion coupling and a plurality of outlet fasteners couple the outlet endplate to the outlet portion of the expansion coupling.

12. The modular valve assembly of claim 11, wherein tightening of the plurality of inlet fasteners and the plurality of outlet fasteners transitions the expansion coupling from the compressed position towards the expanded position.

13. A modular valve assembly comprising:
- an inlet endplate having an inlet coupling;
- an outlet endplate having an outlet coupling;
- a first flow fixture disposed between the inlet endplate and the outlet endplate;
- a second flow fixture disposed between the inlet endplate and the outlet endplate, the first flow fixture and the second flow fixture movable between a flow position and a maintenance position; and
- an expansion coupling disposed between the first flow fixture and the second flow fixture such that, when the first flow fixture and the second flow fixture are in the flow position, a flow path extends from the inlet coupling through each of the first flow fixture, the second flow fixture, and the expansion coupling and out of outlet coupling, wherein compression of the expansion coupling allows at least one of the first flow fixture or the second flow fixture to be moved towards the maintenance position, interrupting the flow path.

14. The modular valve assembly of claim 13 further comprising a first fixture frame and a second fixture frame, the first fixture being coupled to the first fixture frame and the second fixture being coupled to the second fixture frame.

15. The modular valve assembly of claim 14 further comprising a plurality of inlet fasteners and a plurality of outlet fasteners, the plurality of inlet fasteners coupling the inlet endplate to the expansion coupling and extending through the first fixture frame, the plurality of outlet fasteners coupling the outlet endplate to the expansion coupling and extending through the second fixture frame.

16. The modular valve assembly of claim 15, wherein the plurality of inlet fasteners include an inlet pivot fastener and an inlet release fastener and the plurality of outlet fasteners include an outlet pivot fastener and an outlet release fastener, removal of the inlet and outlet release fasteners allowing the first fixture frame and the second fixture frame to pivot about the inlet and outlet pivot fasteners, respectively.

17. The modular valve assembly of claim 13 further comprising a retention bracket coupled to the inlet endplate and the outlet endplate.

18. The modular valve assembly of claim 17, wherein the retention bracket is configured to not interfere with the transition of the first flow fixture and the second flow fixture between the flow position and the maintenance position.

19. The modular valve assembly of claim 13, wherein a plurality of inlet fasteners couple the inlet endplate to an inlet portion of the expansion coupling and a plurality of outlet fasteners couple the outlet endplate to an outlet portion of the expansion coupling.

20. The modular valve assembly of claim 19, wherein tightening of the plurality of inlet fasteners and the plurality of outlet fasteners transitions the expansion coupling from a compressed position towards an expanded position.

* * * * *